(12) United States Patent
Frankel

(10) Patent No.: US 7,008,694 B1
(45) Date of Patent: Mar. 7, 2006

(54) POLYMER FIBERS, FABRICS AND EQUIPMENT WITH A MODIFIED NEAR INFRARED REFLECTANCE SIGNATURE

(75) Inventor: Kevin A. Frankel, Hockessin, DE (US)

(73) Assignee: Invista North America S.A.R.L., Wilmington, DE (US)

( * ) Notice: Subject to any disclaimer, the term of this patent is extended or adjusted under 35 U.S.C. 154(b) by 0 days.

(21) Appl. No.: 11/108,021

(22) Filed: Apr. 15, 2005

(51) Int. Cl.
*D01F 6/00* (2006.01)
*D06P 5/00* (2006.01)

(52) U.S. Cl. .......................... 428/364; 428/919; 8/483
(58) Field of Classification Search ................ 428/364, 428/919; 8/483, 478, 923
See application file for complete search history.

(56) References Cited

U.S. PATENT DOCUMENTS

| | | | | |
|---|---|---|---|---|
| 4,095,940 A | * | 6/1978 | Weingarten | 8/483 |
| 4,408,004 A | * | 10/1983 | Pengilly | 524/398 |
| 5,798,304 A | * | 8/1998 | Clarkson | 442/289 |
| 6,805,957 B1 | * | 10/2004 | Santos et al. | 428/400 |

* cited by examiner

*Primary Examiner*—N. Edwards
(74) *Attorney, Agent, or Firm*—Robert B. Furr, Jr.

(57) ABSTRACT

A modified synthetic polymer filament and multifilament yarn of polyamide or polyester filament containing a carbon black polymer additive, and fabrics from these yarns, are disclosed. These melt spun filaments are especially well-suited for use in garments and equipment where a modified Near Infrared Reflectance (NIR) signature is desired. The yarn and fabrics made from this yarn may be advantageously dyed or printed to provide a camouflage fabric for use in desert sand dominated environments, urban environments and multi-terrain environments.

14 Claims, 6 Drawing Sheets

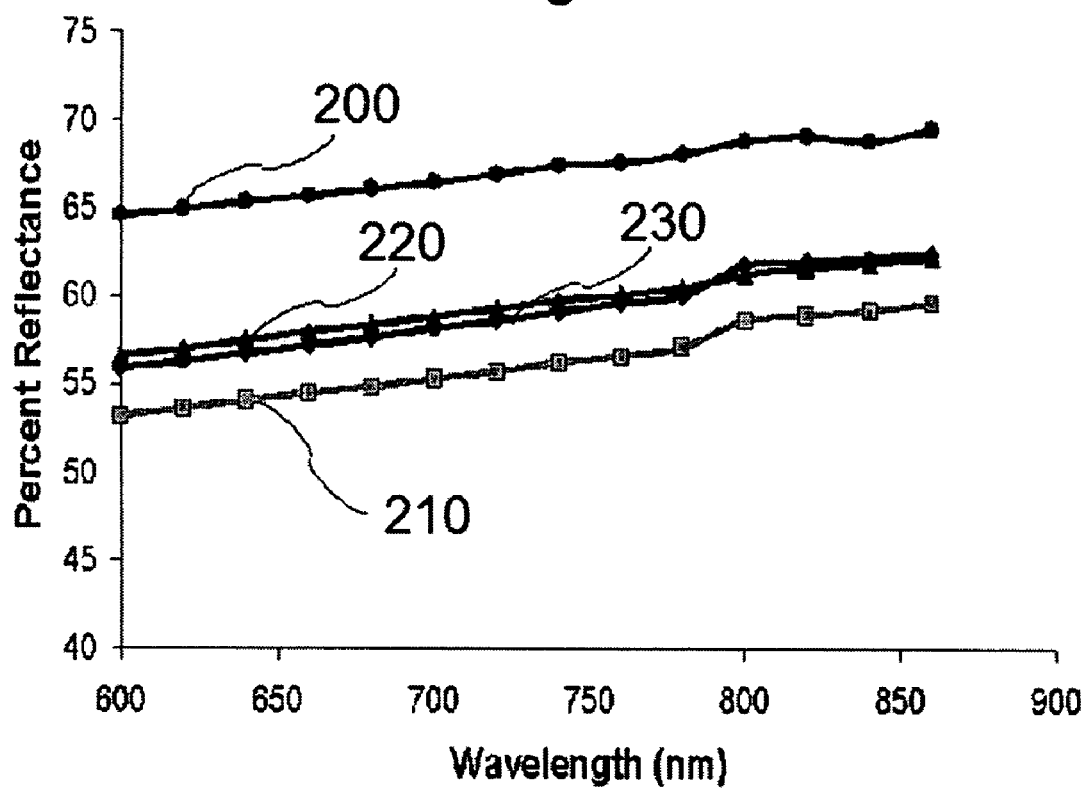

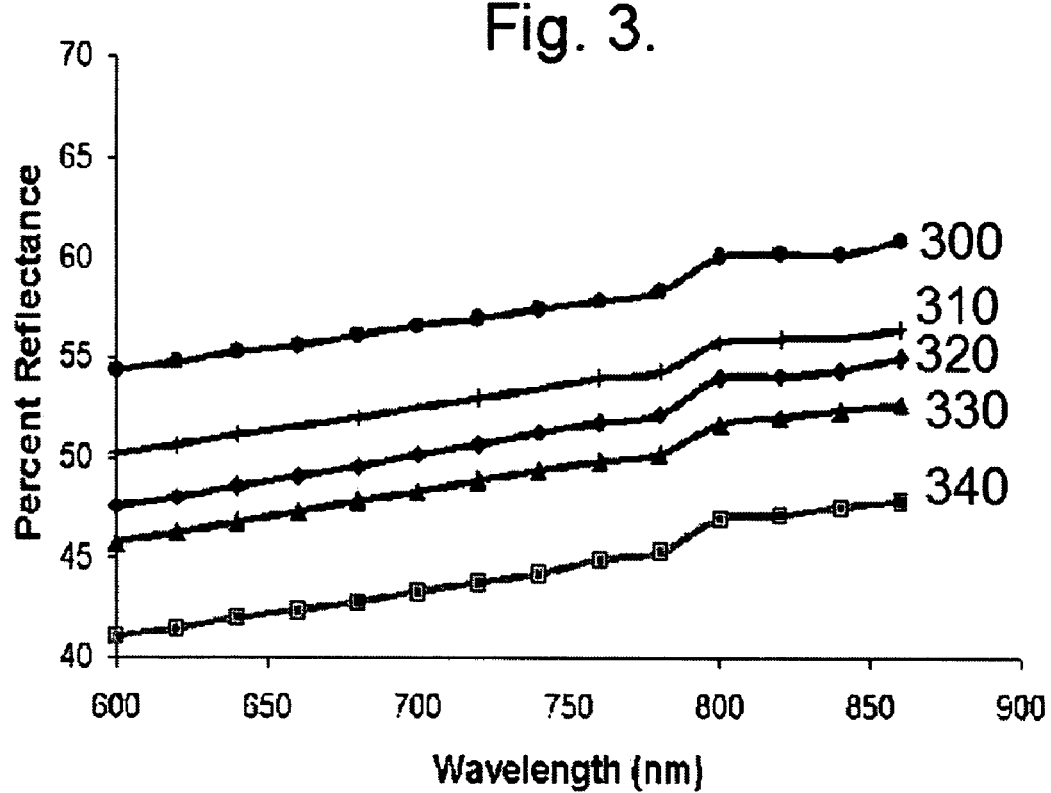

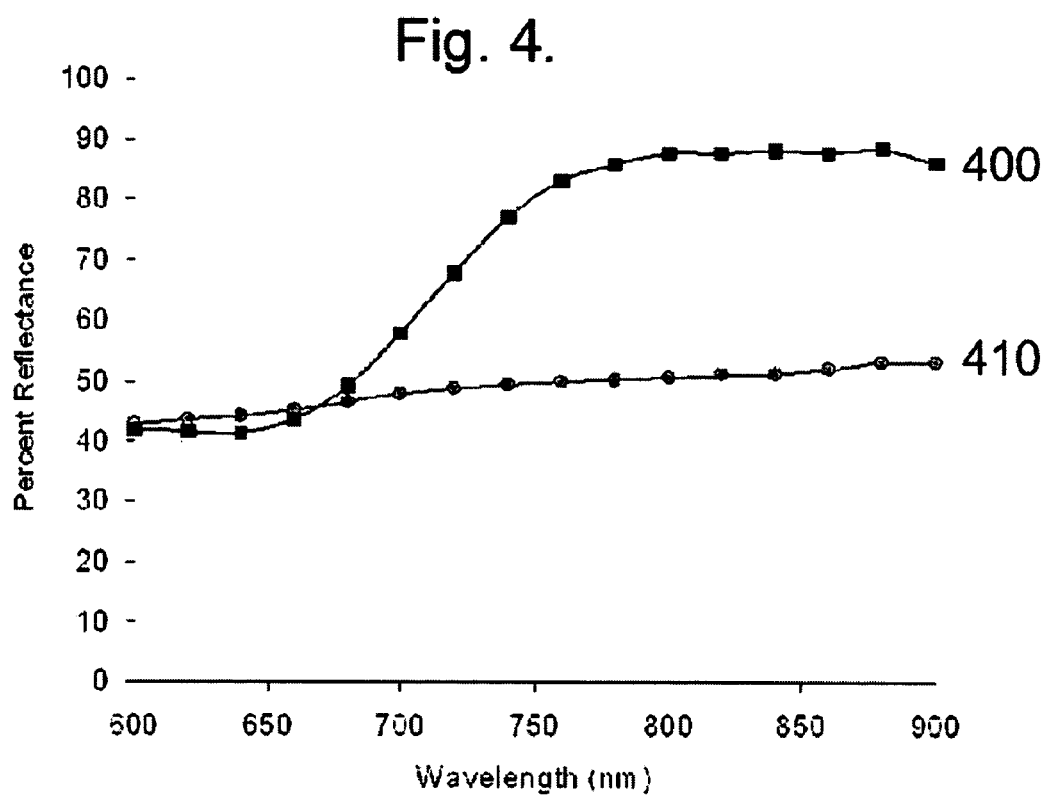

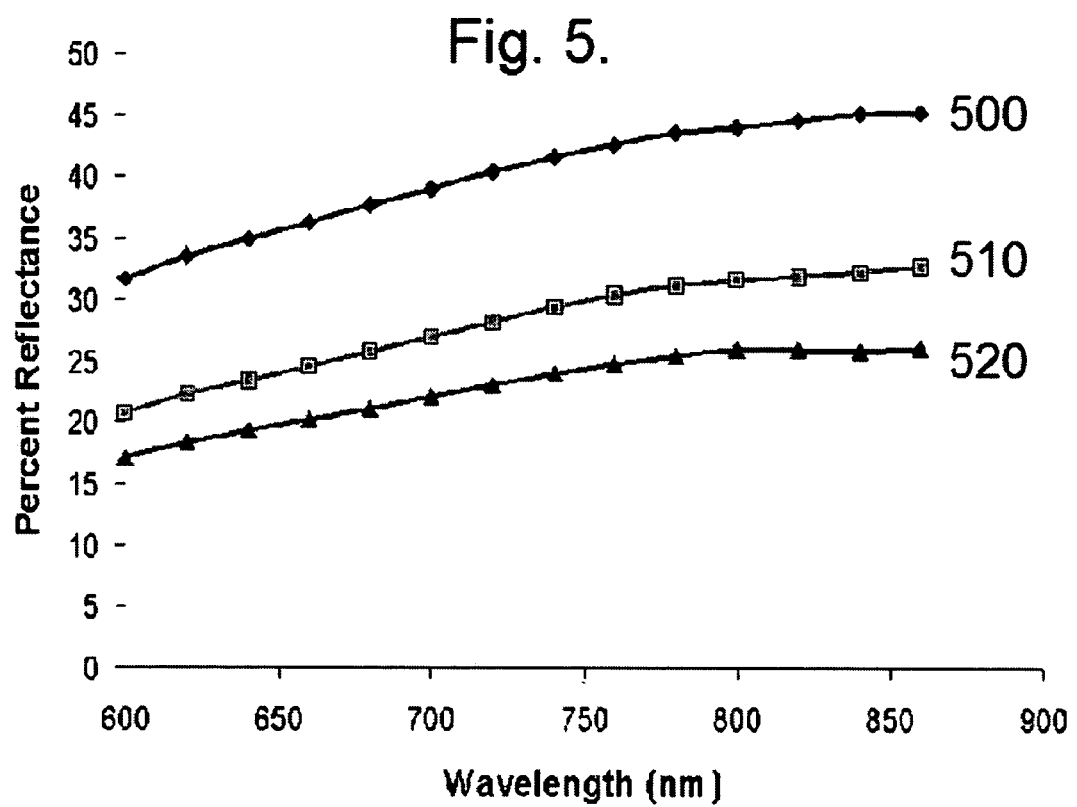

POLYMER FIBERS, FABRICS AND EQUIPMENT WITH A MODIFIED NEAR INFRARED REFLECTANCE SIGNATURE

FIELD OF THE INVENTION

The invention relates to synthetic polymer filaments and yarns, such as polyamide and polyester, containing an additive that modifies the Near Infrared (NIR) reflectance signature of the filaments and yarns, and fabrics from this yarn, to reflectance levels of about 20 to about 65% in the region of 600 nm to 900 nm. Further provided is a dyed fabric made from this yarn which may be advantageously dyed or printed to provide a camouflage fabric for use in desert sand dominated environments, urban environments, and multi-terrain environments.

BACKGROUND OF THE INVENTION

Continuing efforts exist to make fabrics that will be converted into garments (also referred to as equipment), e.g. jackets, rucksacks, ballistic vests, boots, etc. that are substantially invisible in near infrared wavelengths. To do this, the fabric/garment must closely match the NIR signature of the surroundings. Each terrain element has a different reflective signature based on its chemical make-up. For example, foliage (a major component of woodland environments) has a relatively low reflectance in the visible region and a relatively high reflectance in the NIR region. In contrast, sand, a major component of desert environments, and concrete, a major component of urban environments, have a relatively high reflectance in the visible region and a low reflectance in the NIR region. It is well known that polyamide and polyester fibers are very reflective in the 400–2000 nm range. It is desirable to reduce NIR reflectance of polyamide and polyester garments and equipment so that they closely match the NIR reflectance of the environment and are therefore not revealed by the use of night vision devices, such as night vision goggles or image intensified converters.

Techniques to provide near-infrared (NIR) camouflage for dark colors are known in the art. For example, NIR camouflage garments having military solid color olive drab and woodland prints are obtainable through the use of pigmented yarns or by dying yarns using so-called pre-metallized dyes. However, durable garments made from other polymer fibers, such as polyamide fibers, may not exhibit satisfactory dye levelness resulting in higher reflectance than desired in the NIR for olive drab and woodland patterns. Light colored garments such as solid tan (e.g. the color of common desert or beach sand), desert camouflage or more specifically the "U.S. Army 3-day desert print" do not meet NIR reflectance specifications for military applications. As a result, these lightly colored polymeric materials are easily seen with the aid of night vision goggles, especially in the range of 600 to 900 nm.

Known methods to reduce infrared (IR) reflectance of fabrics use IR absorbing pigments in combination with the fabric. For example; U.S. Pat. No. 5,798,304 to Clarkson ("Clarkson"), the disclosure of which is hereby incorporated by reference, discloses that carbon black pigment absorbs light in the IR range 1000 to 1200 nm. Clarkson discloses a fabric that comprises a camouflage pattern, where the camouflage pattern is visible in the IR region but is invisible in the visible region. The fabric may be printed with a non-camouflage pattern that is visible in the visible region of the spectrum. To achieve this, Clarkson prints the fabric with an IR-absorbing material, such as carbon black, a chitin resin or other IR-absorbing pigment. Clarkson discloses that the IR-reflectivity of the fabrics is arranged to match that of the surroundings in which it is to be used. For example, Clarkson discloses that for temperate foliage overall IR reflectivity is typically required to be 35%, which may rise to 70% for desert regions. To achieve the desired overall reflectivity, the camouflage pattern comprises at least two areas of different IR-reflectivity which differ by at least 5%. The IR-camouflage pattern is generally printed onto the fabric after the fabric has been dyed.

U.S. Pat. No. 4,095,940 to Weingarten ("Weingarten"), the disclosure of which is hereby incorporated by reference, discloses a process for producing camouflage dyeing and prints on synthetic or regenerated fibers to obtain dyed materials having camouflage properties in the visible and IR regions. Weingarten reports dyed materials having reflection values of from 20 to 50% in the IR spectrum from 700 to 1100 nm produced by spun-dying fibers with carbon black. For example, Weingarten discloses that spun-dyed polyester rayon comprising 0.02 weight % carbon black alters the IR reflection curve of the fabric but it does not show the required steep increase of the reflection values at about 700 nm characteristic of chlorophyll. Weingarten discloses that the use of carbon black as a mass coloration in the range of 0.005 to 0.5 weight % in synthetic fibers or foils in combination with cross-dyeing can produce IR reflection values of from 20 to 50% between 700 and 1100 nm while only slightly altering the shade of the fabric in the visible wave range. The spun-dyed material alone; without cross-dyeing, did not achieve reflectance values of 5 to 35% at 700 nm; 30 to 50% at 800 nm; and values neither higher nor lower than these values up to 1100 nm. All examples in Weingarten that displayed desirable reflectance values were cross-dyed to a green, olive, green-olive or bluish-green shade.

SUMMARY OF THE INVENTION

The techniques of the present invention provide a synthetic polymer filament, such as polyamide or polyester, and yarn, fabrics and garments (also referred to as equipment), such as jackets, rucksacks, ballistic vests and boots, from these fibers modified in their property of NIR reflection by the addition of carbon black in an amount of about 10 parts per million (ppm) to about 500 parts per million (ppm) and advantageously dyed or printed to provide a sand color or "desert camouflage" visible spectrum appearance. Fabrics made with filaments and yarns of the invention exhibit reduced reflectance in the near infra-red region of 600 nm to 900 nm about 20 to about 65%. The polymer filaments and yarns of the invention can be used to form fabrics according to standard textile processing means, including weaving, knitting and others known to the skilled practitioner. Such fabrics are readily dyed or printed to light colors representative of the desert-like environments according to known methods, including acid dyes known for use with polyamides and disperse dyes known for use with polyesters. Additionally, the filaments and yarns of the invention have been seen to exhibit higher dye absorption properties for polyamides, allowing greater depth of dyeing using the same or less dye over the comparable filament and yarn without the carbon black additive.

One embodiment of the invention comprises a profiled cross-sectional shape polymer filament, such as a polyamide filament or a polyester filament, including an additive. The individual filament fineness of the profiled cross-sectional shape polymer filament is in the range of about 0.7 to about 8 denier per filament (dpf) and the NIR reflectance spectrum in the wavelength region of about 600 nm to about 900 nm is about 20% to about 65%. NIR reflectance modification is provided by both the filament cross-sectional shape and the presence of the additive. The additive comprises a carbon black pigment in an amount from about 10 ppm to about 500 ppm (about 0.0001 to about 0.005 wt. %).

According to another embodiment of the invention, the profiled cross-sectional shape polymer filament comprises about 3 to about 8 dpf and comprises about 30 to about 150 ppm carbon black (about 0.0003 to about 0.0015 wt. %) and having a NIR reflectance spectrum in the wavelength region of about 600 nm to about 900 nm of about 35% to about 65%.

According to another embodiment of the invention, the profiled cross-sectional shape polymer filament comprises about 0.7 to about 3 dpf and comprises about 100 to about 300 ppm carbon black (about 0.001 to about 0.003 wt. %) and having a NIR reflectance spectrum in the wavelength region of about 600 nm to about 900 nm of about 25% to about 55%.

Yet another embodiment of the invention comprises a multifilament yarn comprising a plurality of profiled cross-sectional shape polymer filaments, such as polyamide filaments or polyester filaments, the profiled cross-sectional shape polymer filaments comprising about 0.7 to about 8 dpf and carbon black pigment in an amount from about 10 ppm to about 500 ppm (about 0.0001 to about 0.005 wt. %) and having a NIR reflectance spectrum in the wavelength region of about 600 nm to about 900 nm of about 20% to about 65%.

Yet another embodiment of the invention comprises a fully drawn yarn (FDY) comprising profiled cross-sectional shape polymer filaments, such as polyamide filaments or polyester filaments, comprising about 0.7 to about 8 dpf and carbon black pigment in an amount from about 10 ppm to about 500 ppm (about 0.0001 to about 0.005 wt. %) and having a NIR reflectance spectrum in the wavelength region of about 600 nm to about 900 nm of about 20% to about 65%.

Another embodiment of the invention comprises a process for making a fully drawn yarn (FDY), the process comprising providing a polymer to a melt extruder, the polymer comprising about 10 to less than 500 ppm carbon black; melting and extruding the polymer through a spinneret plate having a plurality of cross sectionally shaped orifices to form a plurality of filaments; quenching and solidifying the filaments; converging the filaments into at least one yarn; applying a finish to the yarn; forwarding the yarn into at least one draw zone; stretching the filaments by a factor of at least 1.5 to form a drawn yarn; relaxing the drawn yarn; and winding the yarn to form a yarn package, wherein the polymer comprises nylon 6,6, nylon 6, polyethylene terephthalate or cationic modified polyesters comprising 5-sulfo-isophthalic acid comonomer, wherein further the yarn comprises about 0.7 to about 8 dpf, wherein further the polymer filament has near infra-red reflectance in the range of 600 nm to 900 nm of about 20% to about 65%.

Yet another embodiment of the invention comprises a partially oriented yarn (POY) comprising profiled cross-sectional shape polymer filaments, such as polyamide filaments or polyester filaments, comprising about 0.7 to about 8 dpf and carbon black pigment in an amount from about 10 ppm to about 500 ppm (about 0.0001 to about 0.005 wt. %) and having a NIR reflectance spectrum in the wavelength region of about 600 nm to about 900 nm of about 20% to about 65%.

Another embodiment of the invention comprises a process for making a partially oriented yarn (POY), the process comprising providing a polymer to a melt extruder, the polymer comprising about 10 to less than 500 ppm carbon black; melting and extruding the polymer through a spinneret plate having a plurality of cross sectionally shaped orifices to form a plurality of filaments; quenching and solidifying the filaments; converging the filaments into at least one yarn; applying a finish to the yarn; relaxing the yarn; and winding the yarn to form a yarn package, wherein the polymer comprises nylon 6,6, nylon 6, polyethylene terephthalate or cationic modified polyesters comprising 5-sulfo-isophthalic acid comonomer, wherein further the yarn comprises about 0.7 to about 8 dpf, wherein further the polymer filament has near infra-red reflectance in the range of 600 nm to 900 nm of about 20% to about 65%.

Yet another embodiment of the invention comprises a profiled cross-sectional shape polymer filament of about 0.7 to about 8 dpf and carbon black pigment in an amount from about 10 ppm to about 500 ppm (about 0.0001 to about 0.005 wt. %) and having a NIR reflectance spectrum in the wavelength region of about 600 nm to about 900 nm of about 20% to about 65%, the profiled cross-sectional shape comprising circular, trilobal or diabolo (also known as "dogbone") shapes.

It is yet another object of the invention to provide a nylon 6,6 polymer filament, and yarn comprising the polymer filament having a carbon black additive in the amount of about 10 ppm to about 500 ppm that provides higher dye absorption properties over comparable filaments and yarns without the carbon black additive.

Another object of the invention is to provide a nylon 6,6 polymer filament, yarn and fabric comprising about 10 ppm to about 500 ppm carbon black which exhibits greater dye absorption properties over comparable polymer filament, yarn and fabrics, and permit the same or greater dye depth using the same or less amount of dye as for the comparable but unmodified nylon 6,6 polymer filament, yarn and fabrics.

BRIEF DESCRIPTION OF THE DRAWINGS

FIG. 2 is a graphical representation of the effect of individual filament fineness (dpf) and filament cross sectional shape at a polymer carbon black loading of 35 ppm in polyamide on NIR reflectance in the range of 600 to 900 nanometers.

FIG. 3 is a graphical representation of the effect of individual filament fineness (dpf) and filament cross sectional shape at a polymer carbon black loading of 70 ppm in polyamide on NIR reflectance in the range of 600 to 900 nanometers.

FIG. 4 is a graphical representation of the effect of a 70 ppm carbon black loading on a polyamide fiber when converted into fabric and dyed the military color Tan 492 on the NIR reflectance in the range of 600 to 900 nanometers.

FIG. 5 is a graphical representation for common sand having a varying amount of water content in the NIR reflectance in the range of 600 to 900 nanometers.

DETAILED DESCRIPTION

Figure 1A:
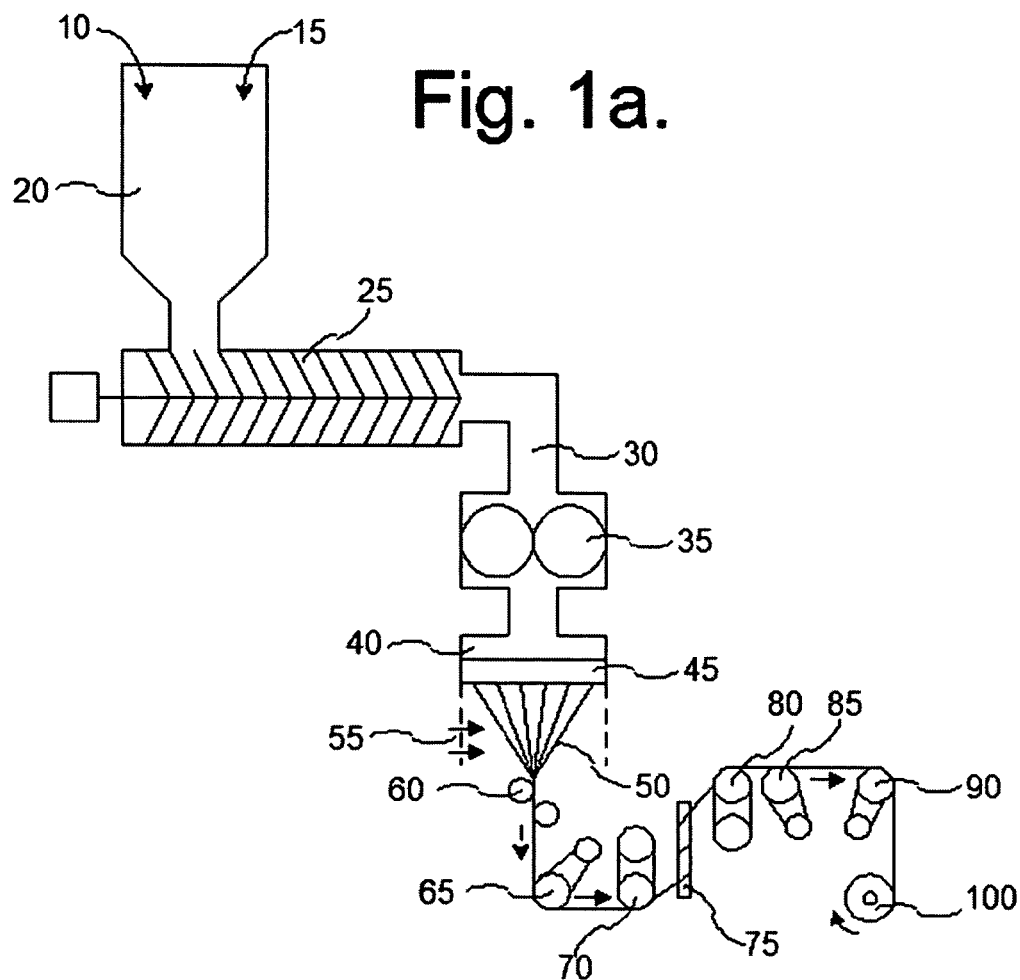
FIGS. 1a and 1b are schematic representations of an apparatus suitable for making the filaments and yarns according to the invention.

The invention relates to filaments and yarns comprising synthetic polymer, such as nylon 6,6, nylon 6, or polyester, and further comprising a carbon black containing material having a NIR signature modified from that of the base synthetic polymer material. The filaments can be used to form multifilament yarns, which may be dyed or printed using conventional methods. The polymer filaments and yarns can be used to form fabrics according to standard textile processing means, including weaving, knitting and others known to the skilled practitioner. These fabrics are readily dyeable or susceptible to printing techniques to provide light colored fabrics representative of the desert-like environments. Known methods for dyeing, especially the use of acid dyes and metal complex dyes used with polyamides and disperse and cationic dyes with polyesters, are suitable. When dyed, these fabrics can have a visual camouflage appearance in the wavelengths of light visible to the human eye if desired. At the same time, these camouflage fabrics exhibit a reduced and desirable reflection of infrared wavelengths including NIR in the range of 600 nm to 900 nm.

The carbon black containing filament and yarn of the invention comprises a profiled cross-sectional shape polymer filament having an individual filament fineness of about 0.7 to about 8 denier per filament (dpf) (0.8 to 8.8 dtex) and reduced near infrared (NIR) reflectance spectrum in the wavelength region of about 600 nanometers (nm) to about 900 nanometers (nm) as compared to a similar profiled cross-sectional shape polymer filament having no carbon black. The NIR reflectance reduction has been observed to be affected by both the filament cross-sectional shape and the presence of the carbon black. The carbon black is present in the filament and yarn in an amount from about 10 parts ppm to about 500 ppm by weight. The carbon black pigment may comprise a nanoparticle with particle size distribution in the range of about 20 nanometers diameter to about 25 nanometers diameter.

According to another embodiment of the invention, the profiled cross-sectional shape polymer filament comprises a dpf of about 3 to about 8 (3.3 to 8.8 dtex) and comprises about 10 to about 150 ppm carbon black.

According to another embodiment of the invention, the profiled cross-sectional shape polymer filament comprises a dpf of about 0.7 to about 3 (0.8 to 3.3 dtex) and further comprises about 100 to about 300 ppm carbon black by weight.

The filament and yarn of the invention may comprise a fully drawn yarn (FDY) having an elongation at break in the range of 25 to 50%. Such fully drawn yarns are useful directly in forming fabrics by weaving processes, for example. These fabrics can be used to fashion garments or equipment, which are dyed or printed to obtain a camouflage visual appearance. Alternatively, these yarns: prior to fabric formation can be dyed directly.

Additionally, the filament and yarn of the invention may comprise a partially oriented yarn (POY) having an elongation at break in the range of 60 to 150%. Such partially oriented yarns are useful as feed yarns for texturing processes or in drawing processes including single ended drawing and warp drawing process, for example. Afterwards, such textured yarns or split process drawn yarns are further processed into fabrics. These fabrics can be used to fashion garments which are dyed or printed to obtain a camouflage visual appearance. Alternatively, these yarns prior to fabric formation can be dyed directly.

Nylon yarns prepared from synthetic polyamide polymer (especially nylon 6,6 and nylon 6) containing carbon black in an amount of about 10 to less than 500 ppm can be used to prepare fabrics having a modified near infrared reflectance signature. As is known to the skilled practitioner, nylon may be dyed with acid dyes, also known as anionic dyes. Dyeing is performed on nylon with any of the acid dyes used in the art, including at least the leveling dyes, milling dyes, metal complex dyes and with fiber reactive dyes. One skilled in the art would know, or follow the dye supplier's instructions for use, under what conditions of pH and temperature these acid dyes or fiber reactive dyes are applied to nylon, e.g. leveling dyes are applied at neutral or weakly acid pH and milling dyes are applied at pH from 5.2 to 7. Certain dye auxiliary chemicals including at least acetic acid and ammonium acetate along with leveling and sequestering agents are known acid dyeing liquor constituents. Generally, the dyeing conditions include, after a nylon substrate pre-wash at 55–60° C.: fixing a dye bath to a dye liquor to nylon substrate ratio of ca. 30:1, setting an initial temperature of 40° C. at which the nylon substrate is added and waiting 10 to 20 minutes at 40° C. before the acid dyes are added; after 45 minutes, raising the dye liquor and nylon substrate to 100° C.; and maintaining the dye liquor and nylon substrate is at 100° C. for 45 minutes to 1 hour. Such conditions are standard and generally known to those skilled in the art of dyeing nylon through the disclosures found in the publication called *DYEING PRIMER a Series of Short Papers on the fundamentals of Dyeing* and reprinted from Textile Chemist and Colorist by the American Association of Textile Chemists and Colorists, Research Triangle Park, North Carolina, Copyright 1981.

Polyester yarns prepared from polyester polymer (for example, polyethylene terephthalate) containing carbon black in an amount of about 10 to less than 500 ppm are also believed capable of being used to prepare fabrics having a modified near infrared reflectance signature. As is known to the skilled practitioner, polyester may be dyed with disperse dyes. Disperse dyes are generally applied in aqueous media at the boiling temperature and include a carrier of the dye dispersion used to open the polyester polymer structure making it receptive to the dye. Disperse dyes can also be applied under super-atmospheric conditions without a carrier at temperatures of about 125 to 135° C. In either dyeing process, the goods to liquor ratio is in the range of 1:15 to 1:25 and the duration of the dyeing is about one hour to one and one half hours. Similarly, polyester polymer modified with carbon black is also selectable from those polymers containing a portion of 5-sulfo-isophthalic acid comonomer. Such "cationic" modified polyesters (e.g. DACRON® and TERYLON®) are known throughout the art. Yarns prepared from cationic polyester are receptive to dyes of the class known as basic, also known as cationic, dyes. Basic dyes are dyes whose amino groups are not free but participate in forming a bond with the fibers. As a result, these polyesters are dyeable under mild conditions. A suitable color palette of disperse and cationic dyes are available from several manufacturers and may be selected to provide a camouflage print adaptable to a desert environment. In combination with a fabric of carbon black modified polyester polymer yarn, it is believed that the same objectives of the instant invention obtained using polyamide based fabrics are available to the skilled practitioner.

The profiled cross-sectional shape of the filament and yarn of the invention may comprise circular, trilobal and dogbone (also known as diabolo) shapes.

Figure 1B:
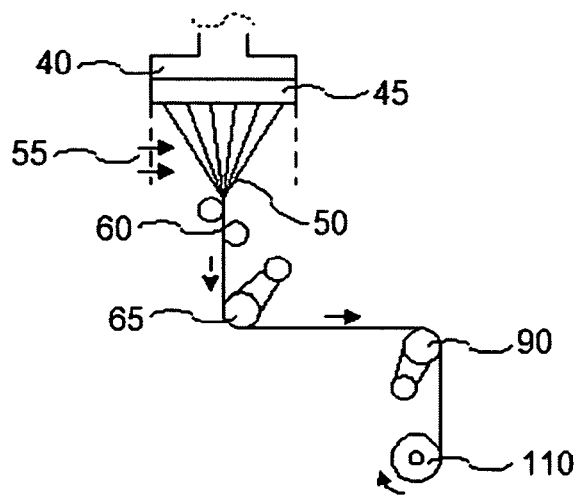

The filaments and yarns according to the above embodiments of the invention can be prepared according to a process employing the apparatus schematically represented by FIGS. 1a and 1b. For the purpose of preparing FDY (fully drawn yarns) according to the invention, the apparatus of FIG. 1a may be used. For the purpose of preparing POY (partially oriented yarns) according to the invention, the apparatus of FIG. 1b may be used.

For FDY, a polymer 10 and a measured amount of carbon black concentrate 15 dispersed in a polymer matrix are added in the form of chips to a feed hopper 20. A suitable polymer carbon black dispersion can be obtained from AMERICHEM, INC. (225 Broadway East, Cuyahoga Falls, Ohio 44221 USA) and is known as "Product 11793-F1 Black." The combined chips in the feed hopper 20 are fed to an extruder 25 where melting takes place. The pressurized melt of polymer containing carbon black additive is transferred via line 30 to a spinning head pressure pump 35 which forces the melt through a spinning filter pack 40 and directly extrudes the polymer/carbon black melt through a spinneret plate 45. The pump 35 fixes the volumetric flow of polymer/carbon black melt to the spinneret and fixes the individual filament fineness, or denier per filament (dpf), prior to any drawing step. The spinneret plate 45 comprises a plurality of orifices through which the melted polymer passes. Each orifice provides a single filament 50. The orifices are selected to have the desired cross sectional shape of an individual filament 50. Generally, the filaments 50 comprise a circular (also called round) in cross sectional shape. Other cross sectional shapes may be used in the invention such as three-lobed (trilobal) and diabolo ("dogbone"). The total number of orifices in the spinneret plate 45 determine the number of total filaments 50 which are converged into a single yarn. For example, 20 orifices provide 20 filaments that are then converged into a single yarn. As the freshly extruded filaments 50 exit from the spinneret plate 45, the filaments 50 are cooled (quenched) by a side draft of conditioned air 55. The filaments 50 are converged into a multifilament yarn after solidification by roll assembly 60 that also applies a spin finish (or process oil) to the yarn. The yarn is forwarded from 60 by feed roll assembly 65 into a first stage of drawing 70. The first stage draw roll assembly 70 accelerates the yarn to speed greater than the speed acquired from the feed roll 65. The ratio of speeds of draw roll assembly 70 to feed roll assembly 65 fixes the draw ratio of the yarn in a first stage, which is typically in the range of about 1.8 to 3:2. The yarn is further drawn in a second stage comprising a hot tube 75, around which the yarn takes at least one full wrap, and draw roll assembly 80. Second stage draw ratios are typically in the range of 3.3 to 5.0. After drawing, the yarn is relaxed via an assembly of relaxation rolls 85 and 90 by an amount in the range of 9 to about 18%. The relaxation effectively lowers the speed of the yarn to more closely match the speed of the winding process and manage the yarn tension in winding. The full drawn yarn is forwarded to the winder and wound up as a package 100. Those skilled in the art will be able to determine process conditions without undue experimentation.

A FDY can also be prepared using the apparatus of FIG. 1a but with a single stage of drawing by removing draw tube 75 and roll assembly 80 from the spinning apparatus. Optionally, the second stage of draw can be operated at a roll surface speed to match the speed of the yarn from the first stage drawing. Effectively, this removes the second stage of draw from the process. In the process employing a single stage of drawing, the draw ratios are typically about 1.5 to 3.5. After drawing, the yarn is relaxed via an assembly of relaxation rolls 85 and 90 by an amount in the range of 9 to about 18%. The relaxation effectively lowers the speed of the yarn to more closely match the speed of the winding process and manage the yarn tension in winding. The full drawn yarn is forwarded to the winder and wound up as a package 100. Those skilled in the art will be able to determine process conditions without undue experimentation.

An assembly for preparing POY is shown in FIG. 1b. A polymer 10 and a measured amount of carbon black concentrate 15 dispersed in a polymer matrix are both added in the form of chips to a feed hopper 20 exactly as seen in FIG. 1a for making the FDY. Process steps are identical to those used in making an FDY as described for FIG. 1a. The melt is forced through a spinning filter pack 40, directly extruding the polymer through a spinneret plate 45. The freshly extruded filaments 50 exiting from the spinneret plate 45 are cooled (quenched) by a side draft of conditioned air 55. The filaments 50 are converged into a multifilament yarn in the same manner as described for FIG. 1a. After solidification, roll assembly 60 applies a spin finish (or process oil) to the yarn. However, for POY, the yarn is then forwarded from roll assembly 60 by feed roll assembly 65 without drawing. The yarn is relaxed slightly in speed via a roll assembly 90. The relaxation effectively matches the speed of the winding process and manages the yarn tension in winding. The partially oriented yarn is forwarded to the winder and wound up as a package 110. Those skilled in the art will be able to determine process conditions without undue experimentation.

FIG. 2 illustrates the relationship between individual filament fineness (dpf) and filament cross sectional shape on % reflectance in the NIR of 600 nm to 900 nm for yarns having a carbon black loading of 35 ppm. Yarns 200–230 comprise nylon 6,6 flat yarn. The yarns as numbered have the following characteristics: 200 (120 yarn denier and 40 filaments, trilobal cross sectional shape); 210 (120 yarn denier and 20 filaments, circular cross sectional shape); 220 (60 yarn denier and 20 filaments, circular cross sectional shape); and 230 (120 yarn denier and 40 filaments, round cross sectional shape). NIR reflectance for yarn 200 (3 dpf (3.3 dtex per filament), tri-lobal cross section) is almost 18% greater than yarn 220 and 230 (3 dpf (3.3 dtex per filament), round cross section) in the range of the 600–900 nm and almost 23% greater than yarn 210 (6 dpf (6.6 dtex per filament), round cross section) in the range of 600–900 nm.

FIG. 3 illustrates the relationship between individual filament fineness (dpf) and filament cross sectional shape on NIR reflectance in the range of 600 nm to 900 nm for yarns having a loading of carbon black additive of 70 ppm. Yarns 300–340 comprise FDY nylon 6,6 flat yarn. The yarns as numbered have the following characteristics: 300 (120 yarn denier and 40 filaments, trilobal cross sectional shape); 310 (78 yarn denier and 26 filaments, diabolo cross sectional shape); 320 (120, yarn denier and 40 filaments, circular cross sectional shape); 330 (60 yarn denier and 20 filaments, circular cross sectional shape) and 340 (120 yarn denier and 20 filaments, circular cross sectional shape). NIR reflectance for yarn 300 (trilobal cross sectional shape) is substantially greater than for yarn 310 (diabolo cross sectional shape), which is greater than other 3 dpf (3.3 dtex per filament) yarns of circular cross sectional profile (320 and 330). The 6 dpf (6.6 dtex) yarn 340 of circular cross sectional shape is distinguished by the lowest NIR reflectance of these samples.

FIG. 4 illustrates the variation in the NIR reflectance for a Light Tan 492 acid dyed fabric 400 in a range between 600 nm and 900 nm. The yarns comprising fabric 400 are FDY nylon 6,6 CORDURA® bright, an air jet textured yarn available from INVISTA North America S. a r. l., Three Little Falls Centre, 2801 Centreville Road, Wilmington, Del. 19808 USA. The FDY yarns comprising Light Tan 492 dyed fabric 410 are nylon 6,6 CORDURA® according to the invention (carbon black loading of 70 ppm). The NIR reflectance for fabric 410 is reduced in the region of about 700 nm to about 900 nm over the sample with no carbon black additive. This region of the NIR spectrum is especially important to camouflage clothing requirements in a desert environment dominated largely by the NIR reflectance of common sand, which is illustrated in FIGS. 5 and 6.

FIG. 5 illustrates the NIR reflection spectrum of common sand collected from naturally occurring deposits near Altus, Okla., USA. Curve 500 is Altus sand in a dry condition, curve 510 is Altus sand in a damp condition and curve 520 is Altus sand in a wet condition. Moisture content of the sand is seen to affect NIR reflectance spectrum. A comparison of FIG. 4 and FIG. 5 indicate that a Light Tan 492 dyed fabric such as 410 is a useful camouflage fabric in any of these sand environments.

Figure 6:
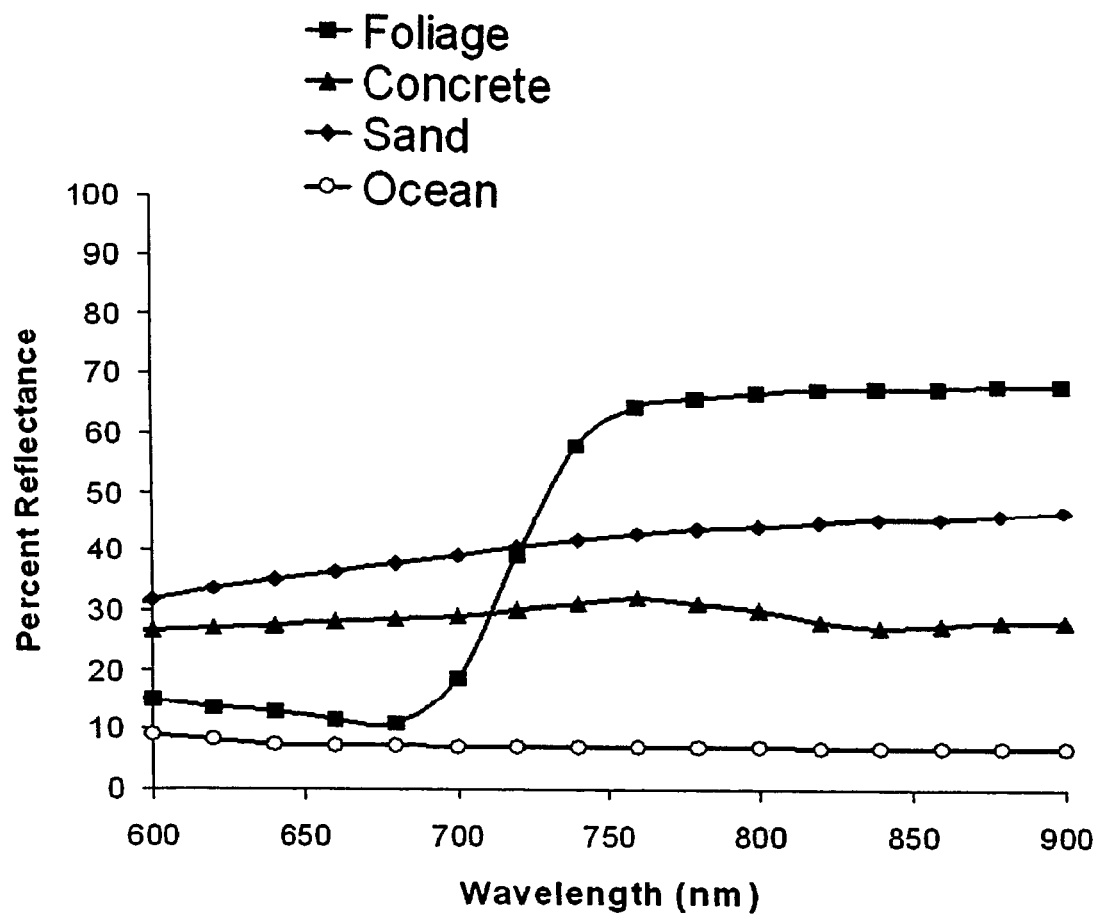
FIG. 6 is a graphical representation of NIR reflectance for common terrain in the range of 600 to 900 nanometers.

FIG. 6 illustrates the different NIR reflectance signatures of common terrain. Sand and concrete have NIR reflectance signatures of about 25% to about 45% in the range of 600 nm to 900 nm. In contrast, foliage has a low NIR reflectance signature of about 10% to about 20% from 600 nm to 700 nm, which increases to about 65% from 760 nm to 900 nm. Water (ocean) has a low NIR reflectance signature of less than about 10% from 600 nm to 900 nm.

EXAMPLES

The following examples are intended to be illustrative only, and are not intended to limit the invention in any manner.

Yarns for Examples 1 through 8 were prepared in substantially the same manner. Variations to the methods for yarn preparation discussed in relation to FIGS. 1*a* and 1*b* for spinning FDY and POY were employed as required. In general, the polymer chip 10 used was nylon 6,6 polymer of relative viscosity (RV) between 40 and 50. The polymer chip 10 was mixed with a polyamide nylon 6 polymer 15 containing carbon black particles into an extruder 25. The carbon black particles are between about 20 and 25 nanometers, preferably about 22 nanometers (obtained from AMERICHEM Inc, Product 11793-F1 Black). The two polymers were mixed and melted to create a homogenous polymer melt containing carbon black pigment. Concentrations of carbon black in the yarn varied between 35 and 500 ppm. The polymer melt was transported through a transfer line 30 that heated the polymer melt to between 288° C.–296° C. during which time the polymer RV was increased to between 60 and 70 RV. Distribution of the carbon black particles in the polymer melt was obtained in the transfer line as the polymer was continually mixed. The melted polymer was filtered 40 and extruded through a spinneret 45 at a temperature between 295–305° C. The spinneret 45 provided control of the denier per filament (dpf) and cross-section at a fixed volumetric flow from meter pump 35. Denier per filament were accessible in the range of 0.7 to 8 using the control means of the apparatus and the meter pump 35 which controls throughput. The cross sectional shape of the filament was determined by the spinneret extrusion orifice shape. Alternative filament cross sectional shapes were selected from circular (round), trilobal (with a modification ratio selectable in the range of 1.5 to 1.9), and diabolo (a.k.a. dogbone shaped). Freshly extruded filaments were quenched in a cross flow of conditioned air 55, converged into a yarn, and a fiber finish was applied to the yarn and further processed according to whether an FDY or POY yarn was desired. Dyeing was then performed for the fabrics of Example 1 using Light Tan 492 dye under the following dyeing conditions: a liquor to nylon substrate ratio of ca. 30:1, known also as liquor to goods ratio; an initial temperature of 40° C. at which the nylon substrate was added; 10 to 20 minutes at 40° C. before the acid dyes were added; 45 minutes to raise the dye liquor and nylon substrate to 100° C.; and a 45 minutes to 1 hour period during which time the dye liquor and nylon substrate was maintained at 100° C.

Test Methods

The near infrared (VIS-NIR) spectrum throughout this disclosure was measured using a CARY 5000™ spectrometer. A diffuse reflectance accessory was employed to measure the reflectance curves in the 600 to 900 nm range. The yarn samples were carefully wound about a card so that the card reflectance did not contribute to the NIR reflectance presented to the spectrometer. Similarly, fabric samples were mounted to avoid the background contribution to the NIR reflection measured.

The dye depth of the yarns was measured according to the Dye Depth Test Method (ABB). Skeined yarn samples were weighed and dyed by immersion in an aqueous dye solution comprised of 140 ml of a standard buffer solution, 100 ml of 10% Merpol LFH™ (a liquid, nonionic detergent) and 80–500 ml of 0.56% ALIZARINE CYANINE BLUE SAP (C.I. Acid Blue 45). The dye bath pH was 5.9. The dye solution temperature was increased at 3–10° C. per minute from ambient temperature to 120° C., and held at that temperature for 3–5 minutes. The dyed samples were rinsed, dried and measured for dye depth by reflecting calorimeter. The color depth was calculated by means known to the skilled practitioner. Color depth was measured as a chromatic measurement (i.e. at a single wavelength), used throughout the art, or as an apparent measurement (i.e. averaged over all the visible wavelengths). In either case, the control measurement was set to 100% color depth.

Example 1

The yarn of the invention used to prepare fabric 410 (FIG. 4) was melt spun from nylon 6,6 polymer. This polymer was mixed with sufficient 1% carbon black in a nylon 6 matrix (AMERICHEM Inc, Product 11793-F1 Black) in the feed section of an screw melt extruder to prepare a yarn containing 70 ppm carbon black. Polymer was heated at 288° C. The molten polymer was extruded through a spinneret that was sized appropriately to control the production of a 494 denier (540 dtex) and 140 filaments of circular cross section. Freshly extruded filaments were quenched in a cross flow of conditioned air, converged into a yarn and a fiber finish was applied to the yarn. The feed roll controls spin orientation of the yarn. Feed roll surface speed was in the range of speeds between 550 and 800 meters per minute and typically between 640 and 700 meters per minute. This yarn was drawn in two stages. The first stage draw ratio was in the range between 1.8 and 3.2, more typically between 2.6 and 3.0. The second stage draw ratio was in the range between 3.0 and 4.4, more typically between 3.4 and 3.7. After drawing, the yarn was textured in a jet of air and the textured yarn was set by a system of two rolls 85 and 90. Initial relaxation was in the range of 10 and 16%, more typically between 11 and 13%.

Initial relaxation ratio is defined as the ratio of:

(100)(speed of second stage roll 80–speed of puller roll 85)/(speed of second stage roll 80).

The winder tension on the yarn is controlled by a stretch of typically between 0.5% and 1.5%:

(100)(speed of let down roll 90–speed of puller roll 85)/(speed of puller roll 85).

Total relaxation was in the range of 8 and 12%.

Total Relaxation ratio is defined as the ratio of:

(100)(speed of second stage roll 80–speed of winder 100)/(speed of second stage roll 80).

A comparative yarn of the prior art was used to prepare the fabric 400 (FIG. 4). This comparative yarn was melt spun from nylon 6,6 polymer without the additive carbon black modification. This comparative yarn was of the same yarn denier as the invention yarn of fabric 410 described above (494 denier or 540 dtex) and 140 filaments of circular cross section. A yarn comprised of 3.5 denier per filament air textured filaments was produced.

Both the invention yarn and the comparative yarn were used to weave fabrics in a plain weave. Methods traditionally employed in the fabric arts were used to prepare and finish these fabrics. The fabrics were dyed Light Tan 492 using dyeing methods previously described in order to produce the two fabrics labeled 400 and 410 represented by the curves in FIG. 4.

NIR reflectance for the dyed fabrics 400, 410 (FIG. 4) was measured in the spectral range between 600 to 900 nanometers. FIG. 4 illustrates the modification of the NIR reflectance curve for a 3.5 denier per filament air textured yarn by the presence of carbon black at 70 ppm as compared to no carbon black in the polymer. Specifically, 70 ppm carbon black in a 3.5 denier per filament air textured nylon 6,6 yarn provided a 32 to 37% reduction in percent reflectance in the 760 to 900 nanometer range and a 9 to 30% reduction in percent reflectance in the 700 to 760 nm range over a 3.5 denier per filament air textured nylon 6,6 yarn having no carbon black. The resulting fabric of the invention is suitable for military camouflage applications in the desert sand environment, while the comparative fabric having no carbon black is not suitable.

For the filament size of fabrics 400, 410, a carbon black modified polymer dyed in Light Tan 492 is seen to provide an overall reflectance reduction for nylon 6,6 fabrics of between 40 and 55% in the 600–900 nanometer range. This NIR reflection reduction should improve the camouflage effects of nylon 6,6 in desert sand setting and when viewed with night vision assisted means, which include "night vision goggles" and image intensified converters.

The yarns of the invention provide, in addition to the modified NIR signature, the ability to reduce the amount of dyes where it is necessary to dye or print the resulting yarn or fabric. The dye adsorption of the yarn of fabrics 400, 410 was measured by the ABB test described above illustrates this feature, and is reported in the following Table 1.

TABLE 1

Dyeablity of Yarn Based on Standard ABB Dye Test Method

| Concentration of Carbon Black in Yarn Nylon 6,6 Polymer | ABB Dye Absorption Result | Standard Deviation of Absorption Result |
|---|---|---|
| 70 ppm | 220 | 3.34 |
| "bright" yarn no carbon black | 183.9 | 2.14 |

As previously discussed, the ABB test method determines the depth of dyeing for the particular diagnostic blue dye. The higher the ABB Dye Absorption number, the deeper the filament will dye. Table 1 illustrates that filaments of the invention having 70 ppm carbon black content will dye significantly deeper than the standard "bright" yarn fiber having no carbon black.

Example 2

The effect of varied amounts of carbon black on the NIR reflectance of nylon 6,6 was carried out for the spectral region from 600 nm to 900 nm. A regression analysis of carbon black concentration from zero to 500 ppm was performed. For each concentration of carbon black, the average reduction in NIR reflection was measured in the spectral range 680 nm to 860 nm. These data showed an inverse proportionality to the carbon black concentration in nylon 6,6 air textured filaments. A regression analysis provided the following equation:

Log (ave. % NIR reflectance)=1.84–0.000976 (ppm carbon black).

Using this equation, a tailored modification to the NIR spectral signature of a filament, a yarn or a fabric is available in the range from 600 nm to 900 nm. These data are shown in Table 2.

TABLE 2

Effect of Carbon Black Concentration on NIR Reflectance for Nylon 6,6 494-140 (3.5 dpf) With Circular Cross Section

| Carbon Black Concentration Nylon 6,6 polymer | Percent NIR Reflectance 600–700 nm | Percent NIR Reflectance 700–800 nm | Percent NIR Reflectance 800–900 nm |
|---|---|---|---|
| 0 | 79–80% | 79–81% | 78–83% |
| 35 ppm | 57–60% | 59–62% | 59–64% |
| 70 ppm | 51–54% | 53–56% | 52–57% |
| 500 ppm | 20–23% | 22–25% | 21–26% |

Example 3

Nylon 6,6 polymer was mixed with sufficient 1% carbon black in a nylon 6 matrix (AMERICHEM Inc, Product 11793-F1 Black) in the feed section of a screw melt extruder to prepare a yarn containing either 35 or 70 ppm carbon black. The polymer was heated at 290° C. The molten polymer passed through a spinneret that produced a 120-20 round fiber. Freshly extruded filaments were quenched in a cross flow of conditioned air, converged into a yarn and a fiber finish was applied to the yarn. Yarn was drawn onto a feed roll then stretched 2.5× and 3.0× on the second stage roll (4673 mpm), and the yarn was then relaxed by 10.75% and placed on the winder (4200 mpm). The NIR reflectance data over the range of 600–900 nm are shown in Table 3.

TABLE 3

Effect of Carbon Black Concentration on NIR Reflectance for
Nylon 6,6 Yarn of 120-20 (6 dpf) With Circular Cross Sectional Shape

| Carbon Black Concentration Nylon 6,6 polymer | Percent NIR Reflectance 600–700 nm | Percent NIR Reflectance 700–800 nm | Percent NIR Reflectance 800–900 nm |
|---|---|---|---|
| 35 ppm | 50–55% | 55–59% | 59–60% |
| 70 ppm | 40–44% | 44–47% | 47–50% |

Example 4

Nylon 6,6 polymer was mixed with 1% carbon black in a nylon 6 matrix (AMERICHEM Inc, Product 11793-F1 Black) in the feed section of a pressure screw melt extruder to prepare a yarn containing either 35 or 70 ppm carbon black. The polymer was heated at 290° C. The molten polymer passed through a spinneret that produced a 120-40 round fiber. Freshly extruded filaments were quenched in a cross flow of conditioned air, converged into a yarn and a fiber finish was applied to the yarn. Yarn was drawn onto a feed roll then stretched 2.5× and 3.0× on the second stage roll (4673 mpm), and the yarn was then relaxed by 10.75% and placed on the winder (4200 mpm). The NIR reflectance data over the range of 600–900 nm are shown in Table 4.

TABLE 4

Effect of Carbon Black Concentration on NIR Reflectance for
Nylon 6,6 Yarn of 120-40 (3 dpf) and Circular Cross Sectional Shape

| Carbon Black Concentration Nylon 6,6 Polymer | Percent NIR Reflectance 600–700 nm | Percent NIR Reflectance 700–800 nm | Percent NIR Reflectance 800–900 nm |
|---|---|---|---|
| 35 ppm | 55–60% | 58–62% | 61–64% |
| 70 ppm | 45–50% | 50–54% | 52–56% |

Example 5

Nylon 6 polymer was mixed with 1% carbon black in a nylon 6 matrix (AMERICHEM Inc, Product 11793-F1 Black) in the feed section of a pressure screw melt extruder to prepare a yarn containing either 35 or 70 ppm carbon black. The polymer was heated at 290° C. The molten polymer passed through a spinneret that produced a 120-40 round fiber. Freshly extruded filaments were quenched in a cross flow of conditioned air, converged into a yarn and a fiber finish was applied to the yarn. Yarn was drawn onto a feed roll then stretched 2.5× and 3.0× on the second stage roll (4673 mpm), and the yarn was then relaxed by 10.75% and placed on the winder (4200 mpm). The NIR reflectance data over the range of 600–900 nm are shown in Table 5.

TABLE 5

Effect of Carbon Black Concentration on NIR Reflectance for
Nylon 6 Yarn of (3 dpf and Circular Cross Sectional Shape

| Carbon Black Concentration Nylon 6 Polymer | Percent NIR Reflectance 600–700 nm | Percent NIR Reflectance 700–800 nm | Percent NIR Reflectance 800–900 nm |
|---|---|---|---|
| 35 ppm | 55–60% | 58–62% | 61–64% |
| 70 ppm | 45–50% | 50–54% | 52–56% |

Example 6

Nylon 6,6 polymer was mixed with 1% carbon black in a nylon 6 matrix (AMERICHEM Inc, Product 11793-F1 Black) in the feed section of a pressure screw melt extruder to prepare a yarn containing either 35 or 70 ppm carbon black. The polymer was heated at 290° C. The molten polymer passed through a spinneret that produced a 60-20 round fiber. Freshly extruded filaments were quenched in a cross flow of conditioned air, converged into a yarn and a fiber finish was applied to the yarn. Yarn was drawn onto a feed roll then stretched 2.5× and 3.0× on the second stage roll (4673 mpm), and the yarn was then relaxed by 10.75% and placed on the winder (4200 mpm). The NIR reflectance data over the range of 600–900 nm are shown in Table 6.

TABLE 6

Effect of Carbon Black Concentration on NIR Reflectance for
Nylon 6,6 Yarn of 60-20 (3 dpf) and Circular Cross Sectional Shape

| Carbon Black Concentration Nylon 6,6 Polymer | Percent NIR Reflectance 600–700 nm | Percent NIR Reflectance 700–800 nm | Percent NIR Reflectance 800–900 nm |
|---|---|---|---|
| 35 ppm | 55–58% | 58–61% | 61–63% |
| 70 ppm | 45–49% | 49–53% | 53–54% |

Example 7

Nylon 6,6 polymer was mixed with 1% carbon black in a nylon 6 matrix (AMERICHEM Inc, Product 11793-F1 Black) in the feed section of a pressure screw melt extruder to prepare a yarn containing either 35 or 70 ppm carbon black. The polymer was heated at 290° C. The molten polymer passed through a spinneret that produced a 120-40 trilobal fiber. Freshly extruded filaments were quenched in a cross flow of conditioned air, converged into a yarn and a fiber finish was applied to the yarn. Yarn was drawn onto a feed roll then stretched 2.0× and 2.5× on the second stage roll (4673 mpm), and the yarn was then relaxed by 10.75% and placed on the winder (4200 mpm). The NIR reflectance data over the range of 600–900 nm are shown in Table 7.

TABLE 7

Effect of Carbon Black Concentration on NIR Reflectance for
Nylon 6,6 Yarn of 120-40 (3 dpf) and Trilobal Cross Sectional Shape

| Carbon Black Concentration Nylon 6,6 Polymer | Percent NIR Reflectance 600–700 nm | Percent NIR Reflectance 700–800 nm | Percent NIR Reflectance 800–900 nm |
|---|---|---|---|
| 35 ppm | 64–67% | 67–69% | 69–70% |
| 70 ppm | 56–59% | 59–61% | 61–62% |

Example 8

Nylon 6,6 polymer was mixed with 1% carbon black in a nylon 6 matrix (AMERICHEM Inc, Product 11793-F1 Black) in the feed section of a pressure screw melt extruder to prepare a yarn containing 70 ppm carbon black. The polymer was heated at 290° C. The molten polymer passed through a spinneret that produced a 78-26 diabolo (dogbone) fiber. Freshly extruded filaments were quenched in a cross flow of conditioned air, converged into a yarn and a fiber finish was applied to the yarn. Yarn was drawn onto a feed roll then stretched 2.0× and 2.5× on the second stage roll (4673 mpm), and the yarn was then relaxed by 10.75% and placed on the winder (4200 mpm). The NIR reflectance data over the range of 600–900 nm are shown in Table 8.

TABLE 8

NIR Reflectance for Nylon 6,6 Yarn of 78-26 (3 dpf) and Diabolo (dogbone) Cross Sectional Shape

| Carbon Black Concentration Nylon 6,6 Polymer | Percent NIR Reflectance 600–700 nm | Percent NIR Reflectance 700–800 nm | Percent NIR Reflectance 800–900 nm |
|---|---|---|---|
| 70 ppm | 51–53% | 53–56% | 56–58% |

The above description is not intended in any way to be limiting and modifications of the invention will become apparent to those skilled in the art.

What is claimed is:

1. A polymer filament having IR reflectance in the range of 600 nm to 900 nm of 20% to 65% comprising:
   about 10 to 300 p pm carbon black; and
   polymer,
   wherein the polymer filament further comprises one of a circular, trilobal or diabolo profiled cross-sectional shapes, wherein further the polymer comprises polyamide or polyester of about 0.7 to about 8 dpf, wherein further the polymer filament has near infra-red reflectance in the range of 600 nm to 900 nm of about 20% to about 65%.

2. The polymer filament of claim 1, wherein the polyamide comprises nylon 6,6 or nylon 6 or combinations thereof, and the polyester comprises polyethylene terephthalate or cationic modified polyesters comprising 5-sulfoisophthalic acid comonomer or combinations thereof.

3. The polymer filament of claim 1 comprising about 3 to about 8 dpf and about 10 to about 150 ppm carbon black.

4. The polymer filament of claim 1 comprising about 0.7 to about 2.9 dpf and about 100 to about 300 ppm carbon black.

5. The polymer filament of claim 1 further comprising a dye.

6. The polymer filament of claim 5, wherein the dye comprises Light Tan 492.

7. The polymer filament of claim 5, further comprising a print pattern.

8. The polymer filament of claim 7, wherein the print pattern comprises a light color with low reflectance in the NIR such as the U.S. Army 3-day desert print.

9. A multifilament yarn comprising the polymer filament of claim 1.

10. The multifilament yarn of claim 9 further comprising a fully drawn yarn (FDY).

11. The multifilament yarn of claim 9 further comprising a partially oriented yarn (POY).

12. A fabric comprising the polymer filament of claim 1.

13. A garment comprising the fabric of claim 12.

14. The garment of claim 13 comprising a jacket, a rucksack, a ballistic vest or boots.

* * * * *